United States Patent
Ahn et al.

(10) Patent No.: US 9,038,579 B2
(45) Date of Patent: May 26, 2015

(54) FUEL CELL-ENGINE HYBRID SYSTEM

(75) Inventors: Kook Young Ahn, Daejeon (KR); Young Duk Lee, Daejeon (KR); Sang Gyu Kang, Daejeon (KR); Sang Min Lee, Daejeon (KR); Han Seok Kim, Daejeon (KR); Ju Hyeong Cho, Daejeon (KR); Min Kuk Kim, Daejeon (KR); Sung Ho Park, Daejeon (KR); Seung Jin Song, Daejeon (KR); Han Ho Song, Daejeon (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 29 days.

(21) Appl. No.: 13/469,142

(22) Filed: May 11, 2012

(65) Prior Publication Data

US 2012/0285162 A1  Nov. 15, 2012

(30) Foreign Application Priority Data

May 11, 2011 (KR) .................. 10-2011-0044258
Sep. 28, 2011 (KR) .................. 10-2011-0098313

(51) Int. Cl.
| | |
|---|---|
| *F02B 43/08* | (2006.01) |
| *H01M 8/04* | (2006.01) |
| *F02D 19/06* | (2006.01) |
| *F02B 1/04* | (2006.01) |
| *F02M 25/12* | (2006.01) |
| *F02B 43/10* | (2006.01) |
| *F02M 27/02* | (2006.01) |
| *H01M 8/06* | (2006.01) |

(52) U.S. Cl.
CPC .............. *H01M 8/04007* (2013.01); *F02B 1/04* (2013.01); *F02M 25/12* (2013.01); *F02B 43/10* (2013.01); *F02M 27/02* (2013.01); *F02B 43/08* (2013.01); *H01M 8/0618* (2013.01); *H01M 8/04164* (2013.01); *H01M 2250/407* (2013.01); *Y02E 60/50* (2013.01); *Y02E 60/563* (2013.01); *F02D 19/0671* (2013.01); *Y02T 10/36* (2013.01)

(58) Field of Classification Search
CPC ............ F02B 43/10; F02B 1/04; F02B 43/08; F02M 27/02; F02M 25/12
USPC ............................................. 123/3
See application file for complete search history.

(56) References Cited

U.S. PATENT DOCUMENTS

| | | | |
|---|---|---|---|
| 6,283,459 B1 * | 9/2001 | Kojima | ............ 261/36.1 |
| 6,655,325 B1 * | 12/2003 | Botti et al. | ............ 123/3 |
| 6,994,930 B1 | 2/2006 | Geisbrecht et al. | |

(Continued)

FOREIGN PATENT DOCUMENTS

| | | |
|---|---|---|
| EP | 0418864 | 3/1991 |
| KR | 10-0651270 | 11/2006 |

(Continued)

*Primary Examiner* — Lindsay Low
*Assistant Examiner* — Charles Brauch
(74) *Attorney, Agent, or Firm* — Lexyoume IP Meister, PLLC

(57) ABSTRACT

The present invention relates to a fuel cell-engine hybrid system formed to effectively utilize an exhaust gas discharged from a process for generating electricity. A fuel cell-engine hybrid system according to the present invention includes: an electricity generating unit including a cathode and an anode interposing an electrolyte membrane therebetween; and an engine unit connected to a rear end of the electricity generating unit and generating power by receiving the exhaust gas discharged from the anode.

15 Claims, 13 Drawing Sheets

(56) References Cited

U.S. PATENT DOCUMENTS

| | | |
|---|---|---|
| 8,171,718 B2 * | 5/2012 | Gulen et al. ............... 60/39.52 |
| 2003/0118883 A1 * | 6/2003 | Breault et al. ............... 429/26 |
| 2005/0118471 A1 * | 6/2005 | Fukuma et al. ............... 429/22 |
| 2007/0039597 A1 * | 2/2007 | Zukouski ............... 123/568.17 |
| 2007/0220896 A1 | 9/2007 | Varatharajan |
| 2007/0250256 A1 * | 10/2007 | Kang et al. ............... 701/115 |
| 2007/0266995 A1 * | 11/2007 | Ha et al. ............... 123/445 |
| 2007/0295493 A1 * | 12/2007 | Uwe ............... 165/163 |
| 2010/0224064 A1 * | 9/2010 | Iijima ............... 95/267 |
| 2011/0079017 A1 | 4/2011 | Gulen et al. |
| 2011/0199855 A1 | 8/2011 | Hanada |

FOREIGN PATENT DOCUMENTS

| | | |
|---|---|---|
| KR | 10-2007-0043044 | 4/2007 |
| KR | 10-2009-0108123 | 10/2009 |

* cited by examiner

FUEL CELL-ENGINE HYBRID SYSTEM

CROSS-REFERENCES TO RELATED APPLICATION

This application claims priority to and the benefit of Korean Patent Application Nos. 10-2011-0044258 and 10-2011-0098313 filed in the Korean Intellectual Property Office on May 11, 2011 and Sep. 28, 2011, the entire contents of which are incorporated herein by reference.

BACKGROUND OF THE INVENTION (a) Field of the Invention

The present invention relates to a fuel cell-engine hybrid system. More particularly, the present invention relates to a fuel cell hybrid system that generates much more electricity from combination of a fuel cell and an engine.

(b) Description of the Related Art

In general, as is an electrochemical device that converts chemical energy of hydrogen and oxygen directly into electric energy, a fuel cell refers to a system that continuously generates electricity by supplying fuel and oxidizing agent to an anode and a cathode.

Typically, the fuel cell generates electricity directly from an electrochemical reaction of a fuel, and thus electric generation having higher efficiency compared to conventional thermal power can be achieved and fuel reduction is also capable. Since heat is generated as a by-product during the electrochemical reaction, it is possible to recollect the heat and organize cogeneration system. In addition, the fuel cell is a very clean technique because a discharge amount of $NO_x$, $SO_x$, CO, UHC, and $CO_2$ and noise are significantly low compared to coal-fired power generation.

Further, due to modulation, a construction time can be shortened and facility capacity can be controlled, and side designation can be simplified. Therefore, the system can be provided in a city area or in a building such that energy can be economically provided, and various fuels such as natural gas, city gas, methanol, waste gas, and the like can be used so that the system can be applied to a distributed generation plate, a cogeneration power plant, a power source of clean vehicle, and the like.

As shown in FIG. 1, the fuel cell includes a cathode 11 and an anode 12 interposing an electrolyte membrane therebetween. The fuel cell is supplied with a fuel and air, and generates electricity and an exhaust gas of high temperature.

However, the conventional fuel cell cannot effectively utilize the exhaust gas discharged from the anode 12, thereby deterioration efficiency, and this is a problem to be solved.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a fuel cell-engine hybrid system formed to effectively utilize an exhaust gas discharged from a process for generating electricity.

A fuel cell-engine hybrid system according to an exemplary embodiment of the present invention includes: an electricity generating unit including a cathode and an anode interposing an electrolyte membrane therebetween; and an engine unit connected to a rear end of the electricity generating unit and generating power by receiving the exhaust gas discharged from the anode.

The fuel cell-engine hybrid system may further include an air separating unit connected to the engine unit and separating external air into oxygen and nitrogen, and gas including the oxygen separated from the air separating unit is supplied to the engine unit.

The engine unit comprises a premixing member that mixes the exhaust gas and the oxygen before being ignited.

The engine unit may be a homogeneous charge compression ignition (HCCI) engine.

The fuel cell-engine hybrid system may further include a cooling unit provided between the electricity generating unit and the engine unit to cool the exhaust gas discharged from the anode and supply the cooled exhaust gas to the engine unit.

The cooling unit may cool the exhaust gas down to a dew point of water vapor such that the water vapor included in the exhaust gas can be condensed therefrom.

The cooling unit includes a channel through which the exhaust gas flows, a storage member provided in a lower portion of the cooling unit to storage condensed water, and an outlet formed in a lower end of the storage member to discharge stored water, and low temperature cooling water flows to the surface of the channel for heat exchange with the exhaust gas.

The fuel cell-engine hybrid system may include a carbon dioxide capturing unit capturing carbon dioxide discharged from the engine unit.

The fuel cell-engine hybrid system according to another exemplary embodiment of the present invention may further include a cooling unit connected with the anode to cool the exhaust gas flowing therein and a recycling unit supplying carbon dioxide discharged from the engine unit to the cathode.

The fuel cell-engine hybrid system may further include a mixing unit mixing the exhaust gas transmitted from the cooling unit and external air or high pressure fluid and supplying the mixture to the engine unit.

A spiral-shaped internal channel through which a mixture of the exhaust gas and air flows may be formed the mixing unit.

The mixing unit may be a static mixer.

The mixing unit may be an ejector forming vacuum pressure by external air or high pressure fluid.

The recycling unit may include a control valve to control the supply amount of carbon dioxide.

A fuel cell-engine hybrid system according to another exemplary embodiment of the present invention further includes a mixing unit connected to a rear end of the electricity generating unit, and mixing the exhaust gas discharged from anode and external air and supplying the mixture to the engine unit and a turbo charger provided between the mixing unit and the engine unit.

The turbo charger includes a compressor and a turbine, the compressor is provided between a rear end of the mixing unit and an intake end of the engine, and the turbine is connected to an outlet of the engine unit. An intercooler may be interposed between the compressor of the turbo charger and the engine unit such that the overcharged gas may be cooled and supplied to the engine unit with lowered temperature and the volume of the engine unit can be reduced.

The fuel cell-engine hybrid system may further include an electric generator connected to the turbo charger to generate electric power according to driving of the turbine.

A fuel cell-engine hybrid system according to another exemplary embodiment of the present invention further includes an anode recycling blower connected between an outlet and an inlet of the anode and supplying a part of the exhaust gas discharged from the anode to the inlet of the anode.

The fuel cell-engine hybrid systems according to the exemplary embodiments of the present invention provide the following effects.

First, additional power or additional electric power can be generated by an engine unit through utilization of an off gas discharged from an anode so that electric generation efficiency can be improved.

Second, since the engine unit uses a HCCl engine, no additional fuel is required for combustion even through a fuel having a low heat generation amount, like an off gas discharged from an anode is used.

Third, when the heat generation amount is too low due to low concentration of the exhaust gas discharged according to a driving condition, oxygen is supplied instead of air so that the engine unit can be driven without injection of additional fuel.

Fourth, when oxygen rather than air is supplied to engine unit, an inert gas, that is, nitrogen is not included so that concentration of an oxidant is increased, thereby solving a combustion instability problem, and the volume of gas taken into the engine is reduced so that the size of the engine can be reduced, thereby reducing price of the system. The exhaust gas discharged from the engine unit is formed to include only $CO_2$ and $H_2O$ such that $CO_2$ can be captured easily by condensing $H_2O$ from the exhaust gas.

Fifth, when the fuel cell exhaust gas is passed through the condenser and thus water vapor is eliminated, the engine efficiency can be improved by lowering a temperature of gas taken into the engine and increase the fuel concentration, and the volume of the gas supplied to the engine is decreased so that the size of the engine can be reduced.

DETAILED DESCRIPTION OF THE EMBODIMENTS

Figure 1:
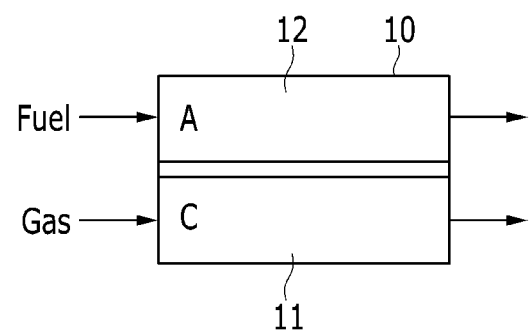
FIG. 1 shows a conventional fuel cell system.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. In addition, like reference numerals designate like elements in the present specification and drawings.

Figure 2:
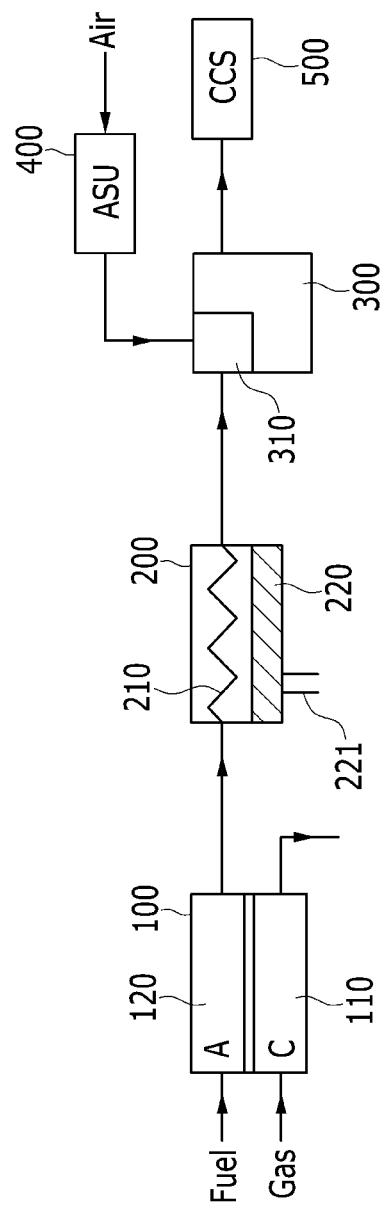
FIG. 2 is a schematic diagram of a fuel cell-engine hybrid system according to an exemplary embodiment of the present invention.

FIG. 2 is a schematic diagram of a fuel cell-engine hybrid system according to an exemplary embodiment of the present invention.

As shown in FIG. 2, a fuel cell-engine hybrid system according to the present exemplary embodiment includes an electricity generating unit 100 including a cathode 110 and an anode 120 interposing an electrolyte membrane therebetween, a cooling unit 200, and an engine unit 300. The cooling unit 200 is connected with the anode 120 and cools the exhaust gas flowing thereinto, and the engine unit 300 generates power by receiving the exhaust gas cooled through the cooling unit 200.

A solid oxide fuel cell (SOFC) or a molten carbonate fuel cell (MCFC) may be used as the electricity generating unit 100, but the present invention is not limited thereto. More various fuel cells may be used as the electricity generating unit 100.

For example, when the electricity generating unit 100 is MCFC, in the cathode 110, carbonate ion ($CO_3^{2-}$) is generated from reaction of oxygen ($O_2$) and carbon dioxide ($CO_2$), and, in the anode 120, an exhaust gas including water ($H_2O$) and carbon dioxide ($CO_2$) and electricity are generated from reaction of hydrogen ($H_2$) the carbonated ion ($CO_3^{2-}$) supplied from the cathode 110.

Carbonate ion ($CO_3^{2-}$) is generated from reaction of oxygen ($O_2$) and carbon dioxide ($CO_2$) in the cathode 110, and a waste gas discharged from other facility such as an steel making plant or a power generation plant may be used to supply oxygen and carbon dioxide to the cathode 110.

In the anode 120, an exhaust gas that includes water and carbon dioxide ($CO_3^{2-}$) and electricity are generated through electrochemical oxidization reaction of hydrogen ion ($H^+$) and carbonate ion ($CO_3^{2-}$) received from the cathode 110. A fuel reforming device may be used to supply hydrogen to the anode 120, and the fuel reforming device functions to convert a fuel (e.g., LPG, LNG, methane, coal gas, methanol, and the like) containing hydrogen to a hydrogen-rich gas for a fuel cell. In addition, a power converter for conversion of a DC output of the electricity generating unit 100 to an AC.

The electricity generating unit 100 includes the cathode 110 and the anode 120, and may be provided with an electrolyte matrix between the cathode 110 and the anode 120 for preventing short-circuit between the two electrodes and provide a path for transmission of carbonate ion from the cathode 110 to the anode 120.

As described above, a conventional full cell system has a problem in proper utilization of an exhaust gas discharged from generation of electricity, but in the present exemplary embodiment, the exhaust gas discharged from the anode is supplied to the engine unit 300 for generation of power such that efficiency of the entire system can be improved.

However, a temperature of the exhaust gas discharged from the anode 120 is about 650° C., and when the high temperature exhaust gas is directly supplied to the engine unit 300, the electric power amount may be decreased. This is because that when a limited-sized combustion chamber of the engine unit 300 is supplied with the high temperature exhaust gas, a fuel amount per unit volume is decreased. In addition, the engine unit 300 may have problem in durability, and generation of electric power may experience a problem due to a change in ignition timing in the engine unit 300.

In order to prevent the problem, a cooling unit 200 is provided to cool the high temperature exhaust gas before being supplied to the engine unit 300 according to the present exemplary embodiment. Thus, the exhaust gas discharged from the anode 120 is cooled through the cooling unit 200 and the cooled exhaust gas is supplied to the engine unit 300. Heat discharged from the cooling unit 200 is thrown outside or recycled for preheating gas flowing inside the system.

The exhaust gas supplied to the engine unit 300 is ignited in the engine unit 300 and explosion force generated from the firing is converted to power, and electricity can be additionally produced when the generator is driven with the power.

As described above, the exhaust gas discharged from the anode 120 is cooled and then supplied to the engine unit 300, and oxidizing agent needs to be supplied into the engine unit 300 for ignition of the exhaust gas in the engine unit 300. In this case, external air is adopted and supplied into the engine unit 300, or the external air is adopted and separated into nitrogen and oxygen, and only oxygen is supplied into the engine unit 300 in the present exemplary embodiment.

In the present exemplary embodiment, an air separating unit 400 for separating external air into oxygen and nitrogen may be further provided, and gas including oxygen generated from the air separating unit 400 may be supplied into the engine unit 300.

The air separating unit 400 may use a cryogenic air separation method. The method is used to separate air into oxygen and nitrogen through a physical process such as liquefaction and rectification in a distillation column using a boiling point (bp) of oxygen and nitrogen. That is, cryogenic air separation method is a method using a boiling point difference of nitrogen (bp: −195.8° C.) and oxygen (bp: −183° C.). Other than the cryogenic air separation method, pressure swing absorption (PSA) method, ion transfer membrane (ITM) method may be used for oxygen supply.

As described, when oxygen is supplied into the engine unit 300 through the air separating unit 400, the exhaust gas can be easily ignited in the engine unit 300.

The engine unit 300 may be provided with a premixing member 310 that premixes the exhaust gas transmitted from the cooling unit 200 and oxygen supplied from the air separation unit 400 before being ignited. Combustion of a mixed gas formed by premixing the exhaust gas and oxygen may reduce generation of exhaust gas.

The engine unit 300 may use a homogeneous charge compression ignition (HCCI) engine.

A diesel engine introduces auto ignition by spraying a liquid fuel like mist to high pressure of about 20:1. Like diesel, fuels can be led to auto ignition at a temperature of 400° C. to 500° C., and the air can be compressed to high pressure before injection of fuel so that an efficiency of the engine can be improved and fuel efficiency can be improved. However, in the present exemplary embodiment, a concentration of the exhaust gas discharged from the anode 120 is lower than that of a liquid fuel used in a diesel engine, and a lot of energy is needed to compress a gaseous fuel at high pressure, accordingly, the diesel engine cannot be used.

In this case, a gasoline engine of which an igniter sets flames to a mixture of air and the fuel and thus explosion occurs may be used, but ignition cannot be easily performed with the exhaust gas discharged from the anode having a low ratio of hydrogen and carbon dioxide so that additional fuel injection is required. The additional fuel injection causes deterioration of efficiency of the entire system.

Thus, in the present exemplary embodiment, the HCCI engine is used as the engine unit 300. The HCCI engine has advantages of the gasoline engine and the diesel engine, and the HCCI engine can perform ignition when a ratio of hydrogen and carbon monoxide is low, and accordingly, power can be effectively generated, and a combustion temperature is lowered due to the low ratio of hydrogen and carbon monoxide so that generation of nitrogen oxide can be prevented.

The cooling unit 200 cools the exhaust gas down to a dew point of water vapor such that the water vapor included in the exhaust gas can be condensed therefrom.

Although a slight variance depending on types or operating conditions of fuel cell may exist, about 80~90% of carbon dioxide and vapor and about 10~20% of hydrogen and carbon monoxide are included in the exhaust gas discharged from the anode 120. That is, the exhaust gas may not be easily ignited due to the low ratio of hydrogen and carbon monoxide.

In the present exemplary embodiment, vapor included in the exhaust gas is eliminated in the cooling unit 200 for easy ignition of the exhaust gas. That is, the cooling unit 200 cools the temperature of the exhaust gas to the dew point of vapor included in the exhaust gas. Then the vapor included in the exhaust gas can be eliminated, and when vapor-eliminated exhaust gas is supplied to the engine unit 300, a ratio of hydrogen and carbon monoxide per volume unit can be improved so that ignition can be simplified.

The cooling unit 200 includes a channel 210 through which the exhaust gas flows, a storage member 220 provided in a lower portion of the cooling unit 200 to store condensed water, and an outlet 221 provided in a lower end of the storage member 200 to discharge stored water.

Low temperature air or water (i.e., cooling water) flows to the surface of the channel 210 for heat exchange with the exhaust gas flowing through the channel 210 such that the exhaust gas is cooled, and vapor included in the exhaust gas is condensed to water.

The liquid state water moves to a lower portion of the cooling unit 200 by the gravity. The storing member 220 is provided in the lower portion of the cooling unit 200 to store the liquid-state water, and the outlet 221 is formed in the lower end of the storing member 200 to discharge the liquid-state water store therein due to self-weight.

In addition, with such a configuration, the outlet 221 is sunk by the stored water so that discharge of the exhaust gas through the outlet 221 can be prevented.

A carbon dioxide capturing unit 500 may be provided in a rear end of the engine unit 300 to capture carbon dioxide discharged from the engine unit 300.

Carbon capture and storage (CSS) is a technique to safely store carbon dioxide discharged from the engine unit 300 by capturing the carbon dioxide with high concentration and then performing compression and transition before the carbon dioxide is discharged to the outside.

A method for separating carbon dioxide in the carbon dioxide capture unit 500 may include a chemical absorption method, a physical absorption method, and a combination of the above two. In addition, a membrane separation method may be used to separate carbon dioxide, and when a membrane is used for separation of carbon dioxide, interactions between molecules, such as a pressure difference, a membrane structure and molecule size, and congeniality to molecules are used.

Figure 3:
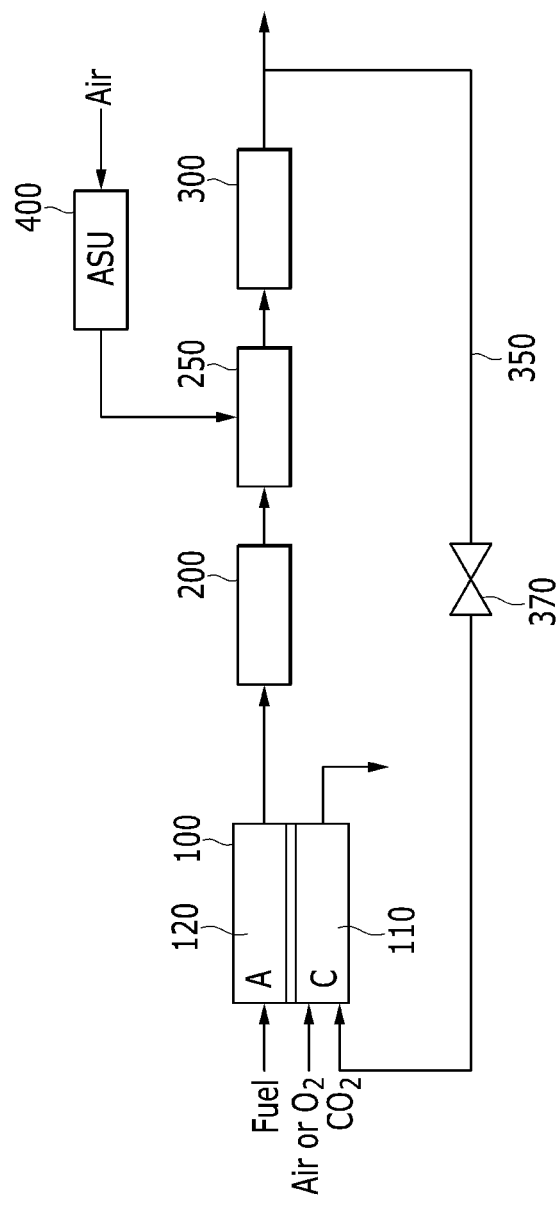
FIG. 3 is a schematic diagram of a fuel cell-engine hybrid system according to another exemplary embodiment of the present invention.

FIG. 3 is a schematic diagram of a fuel cell-engine hybrid system according to another exemplary embodiment of the present invention.

As shown in FIG. 3, the fuel cell-engine hybrid system according to the present exemplary embodiment includes an electricity generating unit 100 including a cathode 110 and an anode 120 interposing electrolyte membrane therebetween, a cooling unit 200, and an engine unit 300. The cooling unit 200 is connected with the anode 120 and cools the exhaust gas flowing thereinto, the engine unit 300 generates power by receiving the exhaust gas cooled through the cooling unit 200, and a recycling unit 350 supplying carbon dioxide discharged from the engine unit 300 to the cathode 110.

In the present exemplary embodiment, since the recycling unit 350 is provided to supply carbon dioxide discharged from the engine unit 300 to the cathode 110, no additional supply of carbon dioxide may be necessary.

In the present exemplary embodiment, as shown in FIG. 3, a mixing unit 250 is provided between the cooling unit 200 and the engine unit 300. The mixing unit 250 mixes an exhaust gas transmitted from the cooling unit 200 and external air and supplies the mixture to the engine unit 300. As described, when the exhaust gas and air are mixed and then supplied to the engine unit 300, generation of exhaust gas from combustion can be reduced.

The exhaust gas and air are pre-mixed through the mixing unit 250 and then the mixture is supplied to the engine unit 300, and flame formed from ignition of the mixture of the exhaust gas and air is called premixed flame. The thickness of the flame is too thin compared to the entire space of the flame such that the thickness is typically regarded as a surface, and the surface is called a flame front and propagation of the flame front through the mixture that does not experience combustion is called flame propagation. The flame propagation can be performed in the mixture in a case that a mixing ratio of the exhaust gas and air is included in a predetermined range, and therefore the mixing ratio of the exhaust gas and air needs to be constantly maintained for uniform mixing.

In the present exemplary embodiment, a spiral-shaped internal channel may be formed in the mixing unit 250 to uniformly mix the exhaust gas and air. The exhaust gas transmitted from the cooling unit 200 and the external air are uniformly mixed while moving along the spiral-shaped internal channel.

Figure 4:
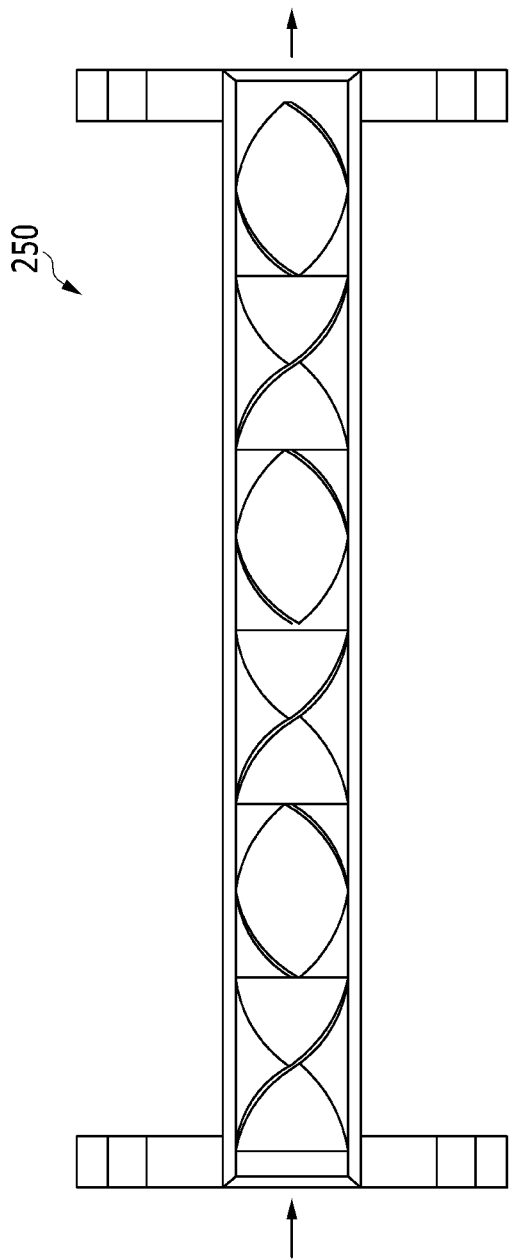
FIG. 4 illustrates an example of a mixing unit of the fuel cell-engine hybrid system of FIG. 3.

FIG. 4 shows an example of the mixing unit of the fuel cell-engine hybrid system of FIG. 3.

As mixing unit 250, a static mixer may be used for uniform mixing of the exhaust and air in the present exemplary embodiment. As shown in FIG. 4, the static mixer is formed of a plurality of serially elements, each twisted through an angle of 180°, and the plurality of elements are placed at an angle of 90° each other.

The static mixer has a channel for uniform mixing of gas flowing therein without using an additional driver. Since no driver is included, noise and vibration do not occur.

Figure 5:
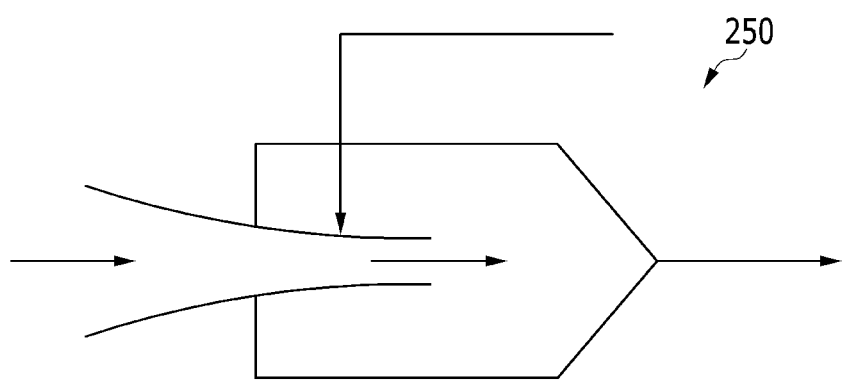
FIG. 5 illustrates another example of a mixing unit of the fuel cell-engine hybrid system of FIG. 3.

FIG. 5 shows another example of the mixing unit of the fuel cell-engine hybrid system of FIG. 3.

In the present exemplary embodiment, an ejector may be used as the mixing unit 250 to uniformly mix the exhaust gas and air. As shown in FIG. 5, a concaved sunk portion is formed in the ejector. When external air is supplied to the ejector and thus passes through the recess portion, the cross-section area of the recess portion is decreased such that the speed of the air is increased, and when the speed of the air is increased, pressure is decreased according to the Bernoulli's principle. When the pressure of the external air is decreased, the exhaust gas flows into the ejector and mixed with the air, and a mixture of the exhaust gas and the air is supplied to the engine unit 300.

As the engine unit 300, a homogeneous charge compression ignition (HCCI) engine may be used.

The recycling unit 350 may be provided with a control valve 370. The control valve 370 controls the amount of carbon dioxide supplied to the cathode 110. In addition, the recycling unit 350 may be provided with an additional separation device (not shown) to separate unburned carbon, CO, $NO_x$, and the like from the engine exhaust gas. The engine exhaust gas contains various types of harmful substances, and when the harmful substances are supplied to the cathode 110, power generation efficiency and durability may be deteriorated.

Oxygen may be separated from the external air and then the separated oxygen may be supplied to the engine unit 300 according to the present exemplary embodiment. For this, an air separating unit 400 that can separate external air into nitrogen and oxygen may be provided, and the air separating unit 400 may use a cryogenic air separation process, pressure swing absorption (PSA) method, or ion transfer membrane (ITM) method. As described, when the fuel concentration of exhaust gas is too low due to a driving condition and thus the amount of heat generation is low, oxygen is applied to the engine unit 300 through the air separating unit 400 to drive the engine unit 300 without supplying additional fuel.

In addition, the exhaust gas discharged from the engine unit 300 can be formed to consist of $CO_2$ and $H_2O$ by supplying oxygen rather than air to the engine unit 30 such that $CO_2$ can be captured.

Air separated through the air separating unit 400 may be supplied to the mixing unit 250 and then mixed with the exhaust gas.

Figure 6:
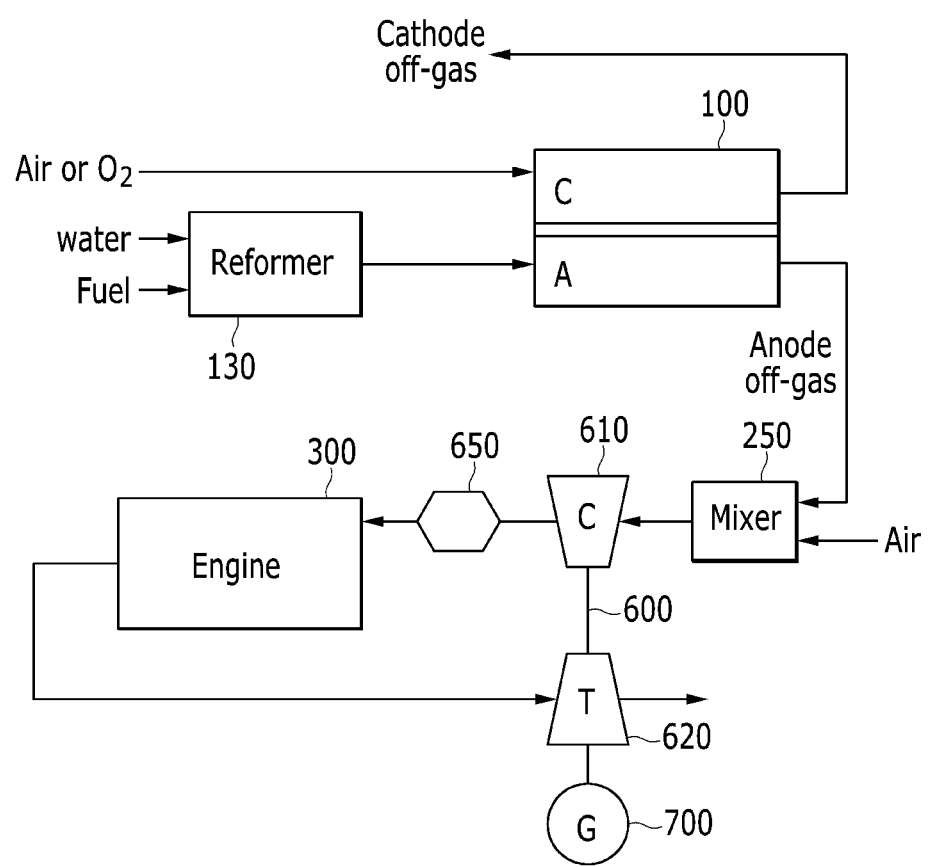
FIG. 6 is a schematic diagram of a fuel cell-engine hybrid system according to another exemplary embodiment of the present invention.

FIG. 6 is a schematic diagram of a fuel cell-engine hybrid system according to another exemplary embodiment of the present invention.

The fuel cell-engine hybrid system according to the present exemplary embodiment includes an electricity generating unit 100 having a cathode and an anode, a mixing unit 250 connected to an outlet of the anode, and an engine unit 300 connected to a rear end of the mixing unit 250. In addition, a turbo charger 600 is provided between the mixing unit 250 and the engine unit 300.

The turbo charger 600 is provided with a compressor C and a turbine T like a known turbo charger. The rear end of the mixing unit 250 is connected to the compressor C and the compressor C is connected to an intake end of the engine unit 300. An exhaust end of the engine unit 300 is connected to the turbine T, and the turbine T may be connected to a generator G to generate power. An intercooler 650 may be interposed between the compressor C of the turbo charger 600 and the engine unit 300 such that the overcharged gas may be cooled and supplied to the engine unit 300 with lowered temperature and the volume of the engine unit can be reduced.

The exhaust gas discharged from the engine unit 300 rotates a turbine wheel of the turbine T and power from the rotation of the turbine wheel rotates a compressor wheel of the compressor C such that a mixed gas discharged from the mixing unit 250 can be charged to the engine unit 300.

As described, since the fuel cell-engine hybrid system according to the present exemplary embodiment includes the turbo charger, the system do not have a problem in efficiency deterioration and a size increase of an engine compared to an output even though an inert gas (e.g., vapor/carbon dioxide/nitrogen) included in the exhaust gas discharged from the anode. In addition, the engine unit 300 can be supplied with a fuel and air without an additional device.

Unlike a general engine charger that charges only air, the fuel cell-engine hybrid system according to the present exemplary embodiment charges an anode off gas and air so that mixing of the fuel and air can be improved and the engine size can be reduced about 37%.

In addition, compression is performed in a cylinder of the engine unit 300 through the charging of the fuel and air and thus an engine output can be improved about 18%, and the entire system efficiency can be improved about 4%. Further, the high temperature/high pressure gas discharged from the outlet of the engine can be used in generation of additional power.

Figure 7:
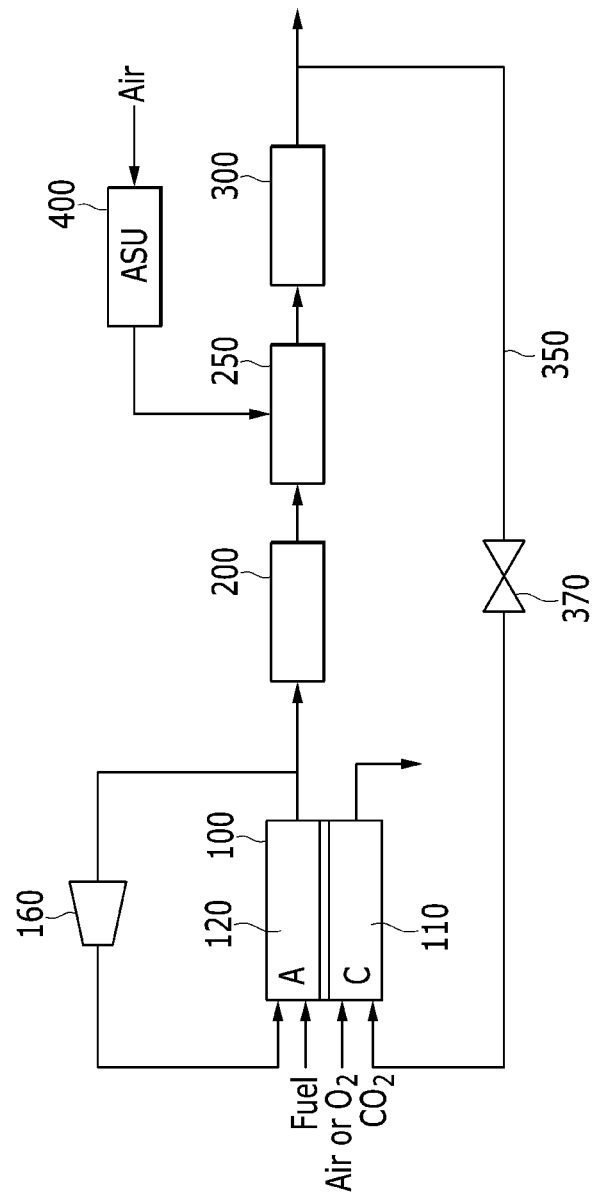
FIG. 7 is a schematic diagram of a fuel cell-engine hybrid system according to another exemplary embodiment of the present invention.

FIG. 7 is a schematic diagram of a fuel cell-engine hybrid system according to another exemplary embodiment of the present invention.

The fuel cell-engine hybrid system according to the present exemplary embodiment has the same configuration of the fuel cell-engine hybrid system shown in FIG. 3, and recycles a part of the exhaust gas discharged from the anode 120 and supplies the recycled portion is supplied back to the anode 120 or an additionally provided fuel reforming unit (not shown) such that efficiency of the system can be improved.

For this, as shown in FIG. 7, an anode recycling blower 160 may be provided between an outlet and an inlet of the anode 120. When the fuel reforming unit (not shown) is provided in the inlet of the anode 120, the outlet of the anode recycling blower 160 is connected to the inlet of the fuel reforming unit, and thus the fuel and the anode discharge gas are mixed and then supplied to the fuel reforming unit.

The anode recycling blower 160 applied to the present exemplary embodiment may be applied to the systems of the exemplary embodiments shown in FIG. 2, FIG. 3, and FIG. 6.

<Simulation Calculation Example>

Hereinafter, simulation results of the above-described exemplary embodiments will be respectively described. In the simulations, a solid oxide fuel cell (SOFC) is applied as an electricity generating unit. Further, a comparative example is provided for simulation compared to the exemplary embodiments of the present invention, and a fuel cell system according to the comparative example includes a catalytic combustor that does not include an engine unit.

Hereinafter, comparison of constructional features of the comparative example and the embodiments is shown in Table 1. FIG. 8 to FIG. 13 are configuration diagrams of systems for simulation according to comparative example 1, embodiment 1, embodiment 2, comparative example 2, embodiment 3, and embodiment 4.

TABLE 1

| classification | Fuel cell type | Configuration of engine unit | Turbo charger | anode recycling |
|---|---|---|---|---|
| Comparative Example 1 | SOFC | Catalytic combustor (no engine included) | Not included | Not included |
| Embodiment 1 | SOFC | HCCI engine | Not included | Not included |
| Embodiment 2 | SOFC | HCCI engine | included | Not included |
| Comparative Example 2 | SOFC | Catalytic combustor (no engine included) | Not included | included |
| Embodiment 3 | SOFC | HCCI engine | Not included | included |
| Embodiment 4 | SOFC | HCCI engine | included | included |

Figure 8:
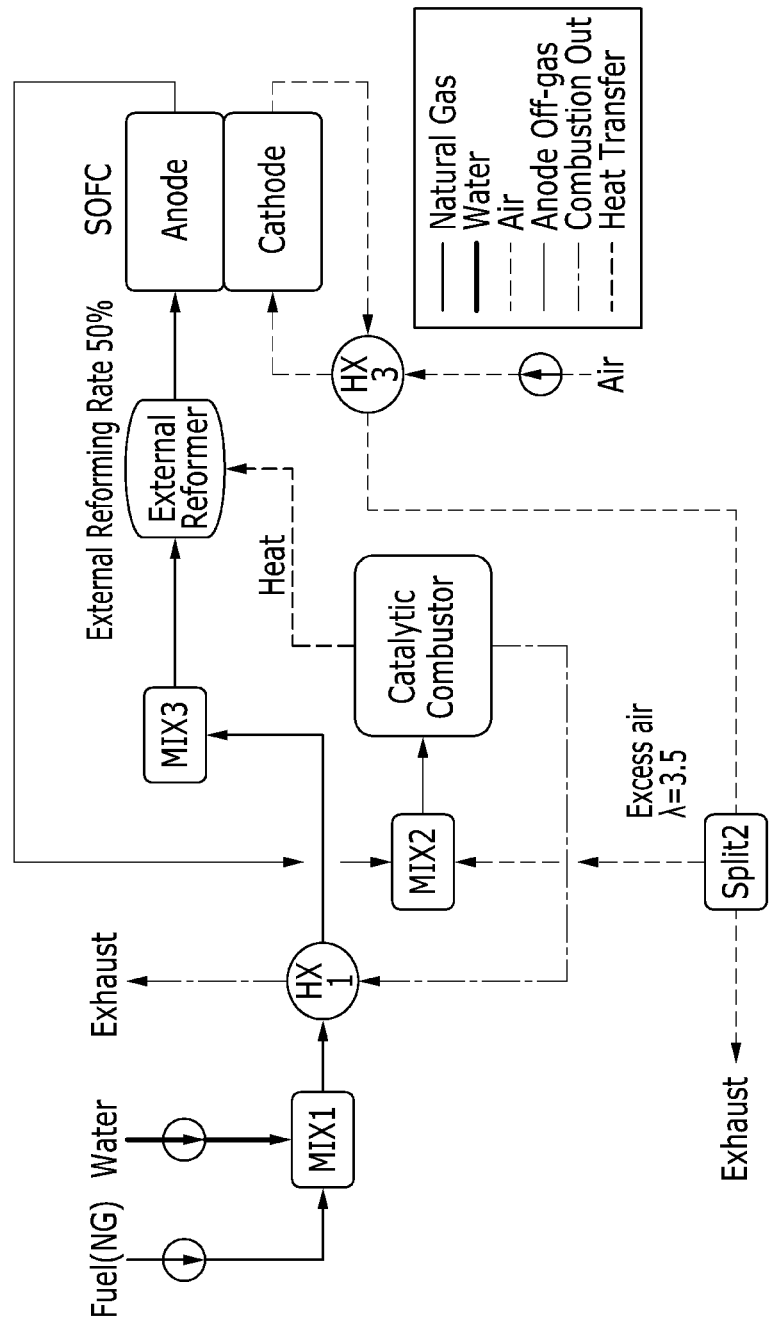
FIG. 8 is a schematic diagram of a fuel cell system formed according to comparative example 1 for simulation.

A fuel cell system according to the comparative example 1 shown in FIG. 8 is provided with a catalytic combustor, and the catalytic combustor is connected to an outlet of an anode through a mixing unit 2 MIX2. The mixing unit 2 MIX2 is also connected with an outlet of a cathode and thus a part of a cathode exhaust gas and an anode exhaust gas are mixed in the mixing unit 2MIX2 and then supplied to the catalytic combustor.

Further, in the fuel cell system, a reformer is provided in an inlet of the anode, and a fuel and water is mixed in a mixing unit 1 MIX1 and then supplied to the reformer. The catalytic combustor generates supplies heat generated from over heat reaction.

Figure 9:
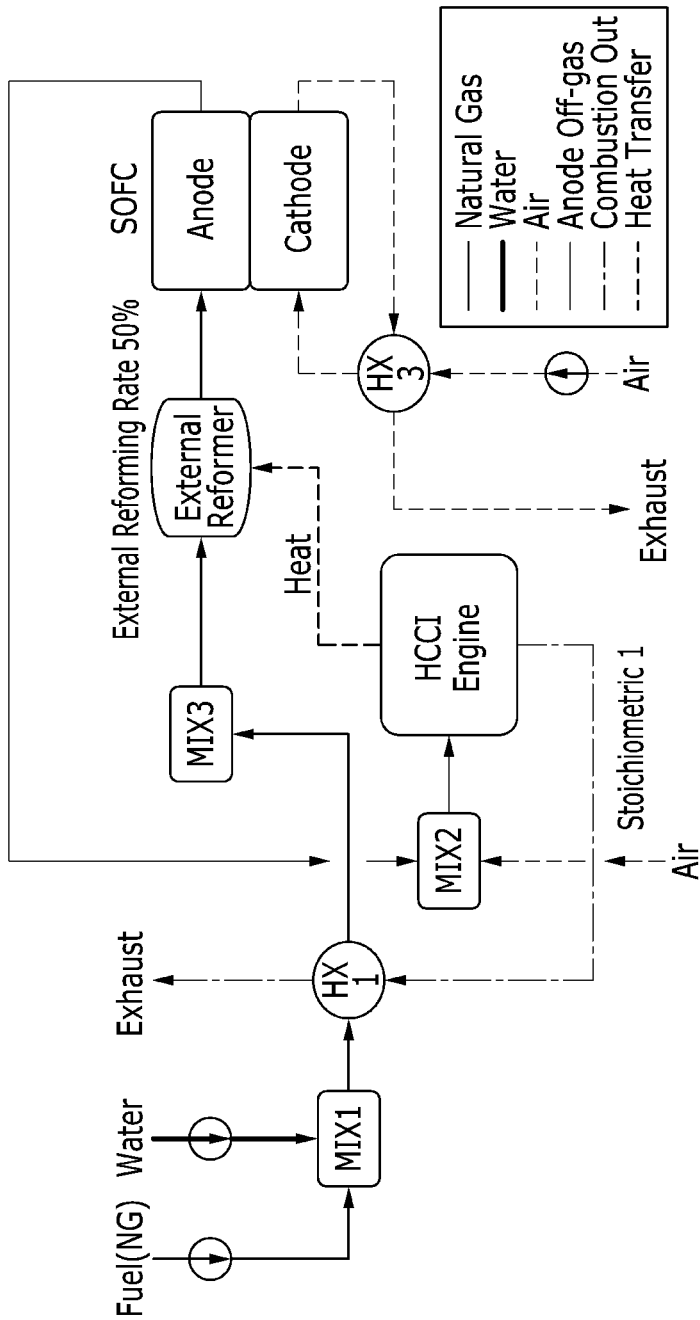
FIG. 9 is a schematic diagram of a fuel cell system formed according to exemplary embodiment 1 for simulation.

A fuel cell-engine hybrid system according to the exemplary embodiment 1 shown in FIG. 9 includes a HCCI engine, and the HCCI engine is connected to an outlet of an anode through a mixing unit 2 MIX2. The mixing unit 2 MIX2 mixes an anode off-gas and external air and the mixture is applied to the HCCI engine.

In addition, the fuel cell-engine hybrid system includes a reformer in an inlet of the anode, and a fuel and water are mixed in a mixing unit 1 MIX1 and the mixture is supplied to the reformer. Power generated from driving of the HCCI engine can additionally generate electricity, and heat generated from the additional electricity generation can be supplied to the reformer.

Figure 10:
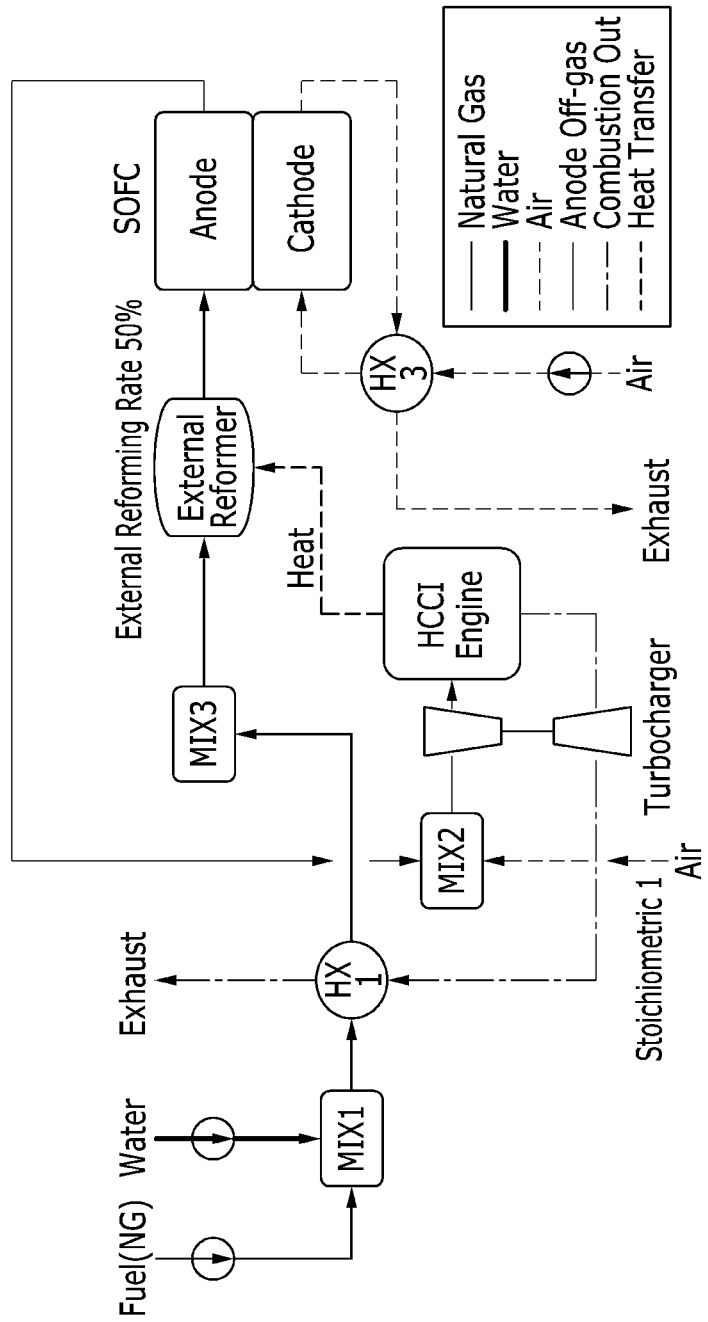
FIG. 10 is a schematic diagram of a fuel cell system formed according to exemplary embodiment 2 for simulation.

A fuel cell-engine hybrid system according to the embodiment 2 shown in FIG. 10 includes a HCCI engine and a turbo charger.

Figure 11:
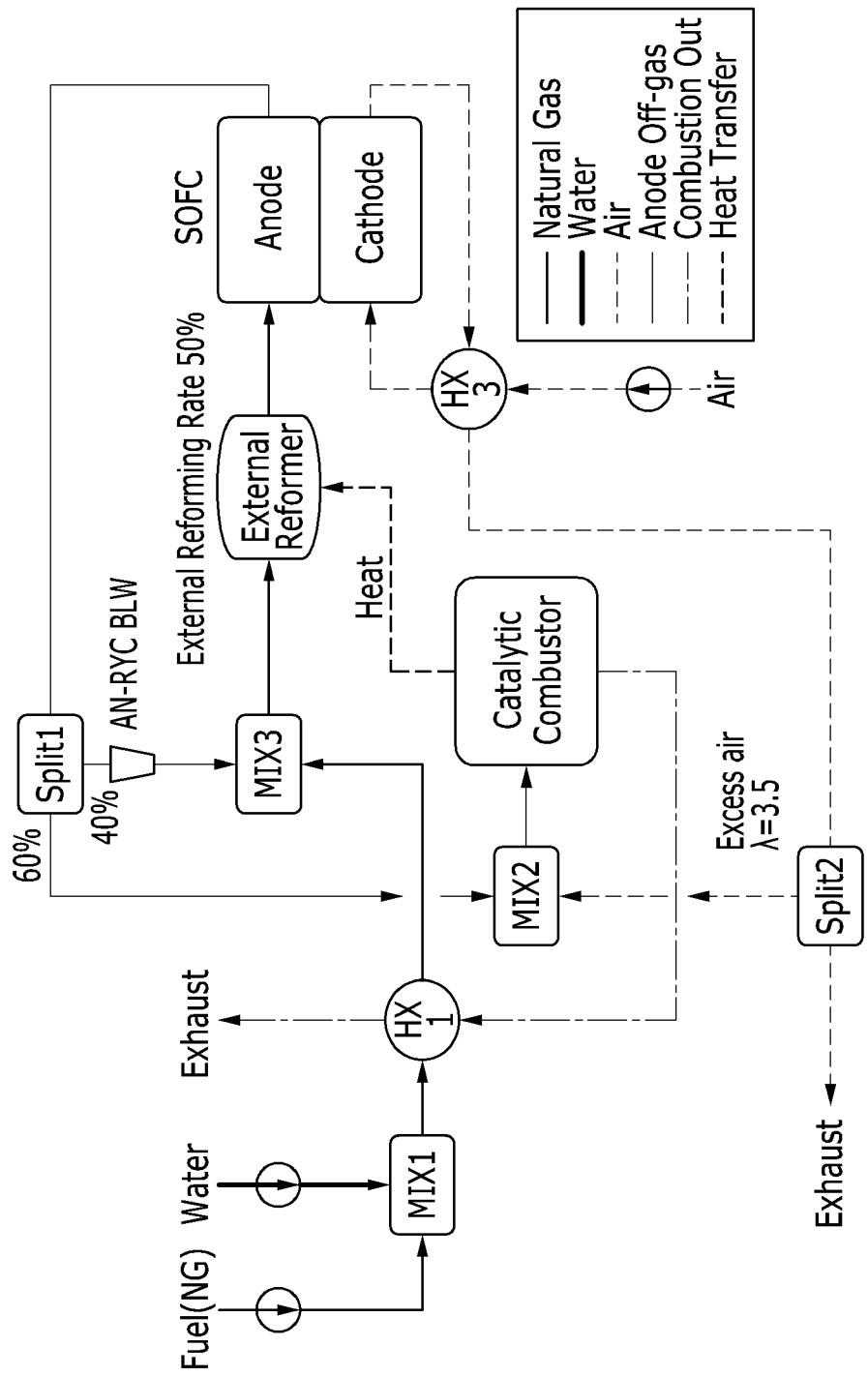
FIG. 11 is a schematic diagram of a fuel cell system formed according to comparative example 2 for simulation.

A fuel cell system according to the comparative example 2 shown in FIG. 11 includes an anode recycling blower in addition to the system of the comparative example 1. The fuel cell system includes a reformer in an inlet of an anode, and the anode recycling blower is connected to an outlet end of the anode and connected with a mixing unit 3 MIX3 connected to the inlet of the reformer. A fuel and water are mixed in a mixing unit 1 MIX1, and the mixture is mixed with an anode off-gas supplied through the anode recycling blower and then supplied to the reformer. Even though not shown in FIG. 10 and FIG. 11, an intercooler may be interposed between the compressor of the turbo charger and the HCCI engine unit such that the overcharged gas may be cooled and supplied to the HCCI engine unit with lowered temperature and the volume of the engine unit can be reduced.

Figure 12:
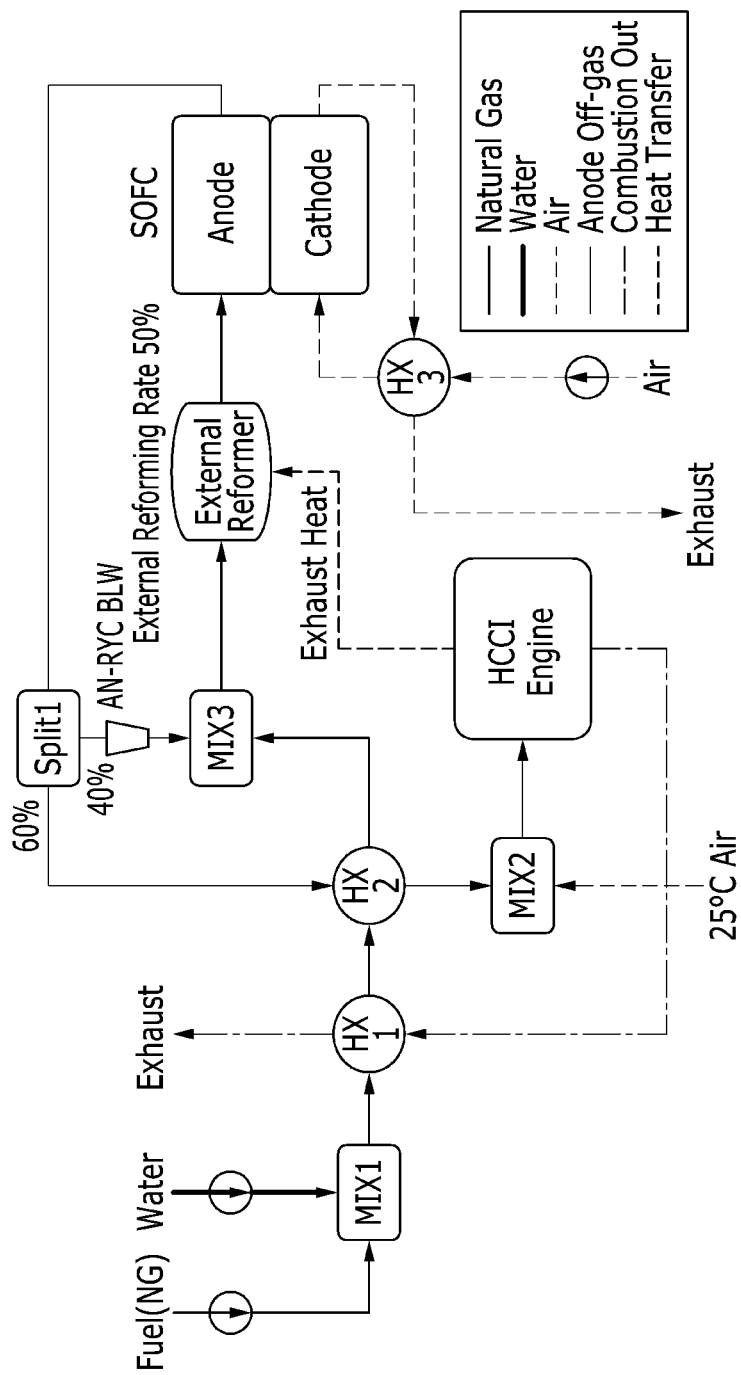
FIG. 12 is a schematic diagram of a fuel cell system formed according to exemplary embodiment 3 for simulation.

A fuel cell-engine hybrid system according to the embodiment 3 shown in FIG. 12 further includes an anode recycling blower in addition to the system of the embodiment 1.

Figure 13:
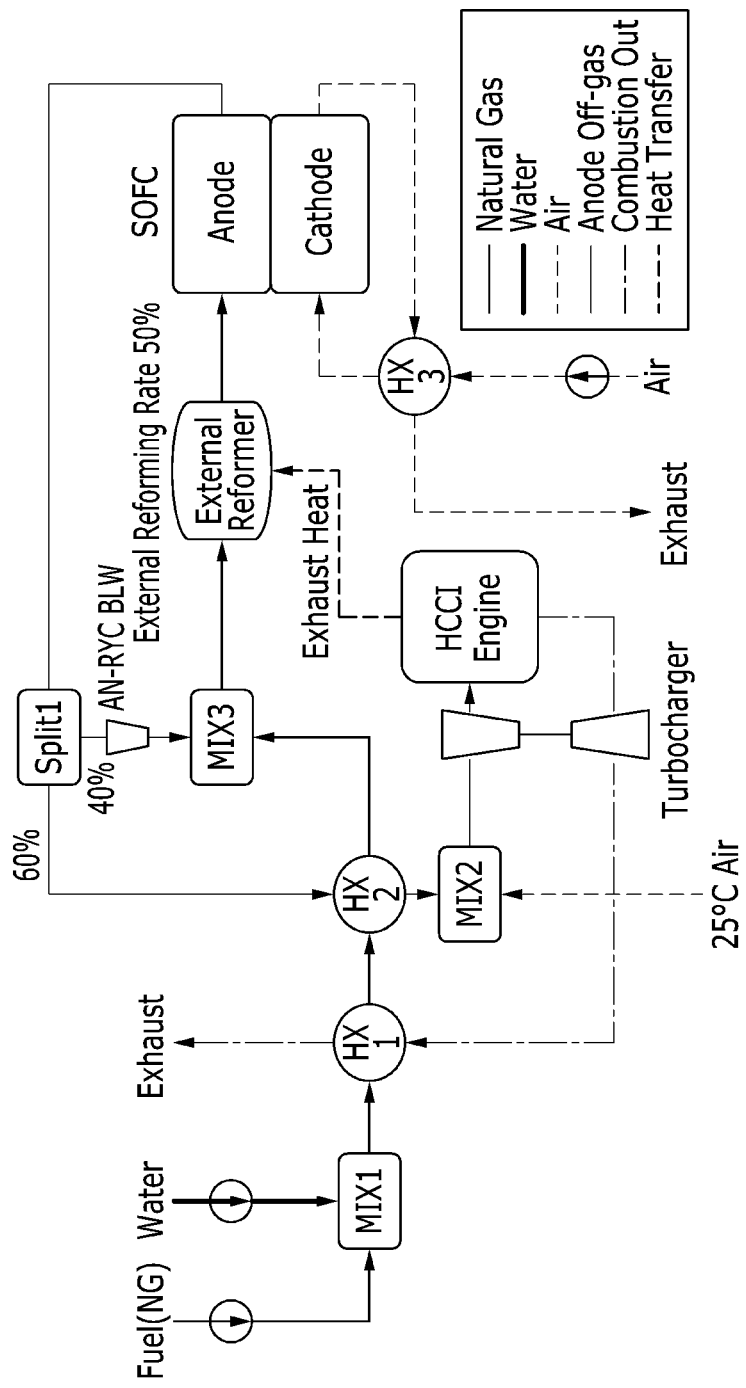
FIG. 13 is a schematic diagram of a fuel cell system formed according to exemplary embodiment 4 for simulation.

A fuel cell-engine hybrid system according to the embodiment 4 shown in FIG. 13 further includes an anode recycling blower in addition to the system of the embodiment 2. Even though not shown in FIG. 13, an intercooler may be interposed between the compressor of the turbo charger and the HCCI engine unit such that the overcharged gas may be cooled and supplied to the HCCI engine unit with lowered temperature and the volume of the engine unit can be reduced.

In FIG. 8 to FIG. 13, MIX denotes a mixture, HX denotes a heat exchanger, and Split denotes a split unit. In addition, in FIGS. 8 to 10, the mixing unit 3 MIX3 may be omitted.

A simulation result of the systems according to the comparative examples and the system according to the embodiments is shown in Table 2.

TABLE 2

| | Comparative Example 1 | Embodiment 1 | Embodiment 2 | Comparative Example 2 | Embodiment 3 | Embodiment 4 |
|---|---|---|---|---|---|---|
| Supplied Fuel (kW) | 173.91 | 173.91 | 173.91 | 156.37 | 156.37 | 156.37 |
| SOFC Power (kW) | 97.98 | 97.98 | 97.98 | 96.52 | 96.52 | 96.52 |
| BOP (kW) | 3.3 | 3.3 | 3.3 | 4.0 | 4.0 | 4.0 |
| HCCI Engine Power (kW) | — | 14 | 17 | — | 6 | 7 |
| Displacemet Volume (L) | — | 9.15 | 7.1 (22% decrease) | — | 5.73 | 3.85 (33% decrease) |
| Net Power (kW) DC | 94.63 | 108.68 | 111.68 | 92.52 | 98.52 | 99.52 |
| Inverter Efficiency (%) | | | 95% | | | |
| Net Power (kW) AC | 89.89 | 103.25 | 106.1 | 87.98 | 93.59 | 94.55 |
| System Efficiency (%) | 51.7% | 59.3% | 61% | 56.2% | 59.8% | 60.5% |

The system efficiencies of the comparative example 1, the embodiment 1, and the embodiment 2 were compared, and the comparative example 1 was 51.7%, and the embodiments 1 and 2 were respectively improved to 59.3% and 61%. In addition, the system efficiencies of the comparative example 2, the embodiment 3, and the embodiment 4 were compared, and the comparative example 2 was 56.2% and the embodiments 3 and 4 were respectively improved to 59.8% and 60.5%.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A fuel cell-engine hybrid system comprising:
   an electricity generating unit including a cathode and an anode interposing an electrolyte membrane therebetween;
   an engine unit connected to a rear end of the electricity generating unit and generating power by receiving the exhaust gas discharged from the anode;
   a cooling unit being disposed subsequent to the electricity generating unit to eliminate vapor of the exhaust gas to improve an ignition of the engine unit, the cooled exhaust gas being discharged from the anode and supplied to the engine unit, the cooled exhaust gas being the sole and main supply gas of the engine unit such that no additional gas is supplied; and
   a mixing unit mixing the exhaust gas transmitted from the cooling unit and external air or high pressure fluid and supplying the mixture to the engine unit,
   wherein the mixing unit is a static mixer forming a internal channel through which a mixture of the exhaust gas and air flows, and wherein
   the internal channel is formed of a plurality of twisted elements and non-twisted elements, each of the twisted elements is alternately disposed corresponding to each of the non-twisted elements.

2. The fuel cell-engine hybrid system of claim 1, further comprising an air separating unit connected to the engine unit and separating external air into oxygen and nitrogen,
   wherein gas including the oxygen separated from the air separating unit may be supplied to the engine unit.

3. The fuel cell-engine hybrid system of claim 2, wherein the engine unit comprises a premixing member that mixes the exhaust gas and the oxygen before being ignited.

4. The fuel cell-engine hybrid system of claim 1, wherein the engine unit is a homogeneous charge compression ignition (HCCI) engine.

5. The fuel cell-engine hybrid system of claim 1, wherein the cooling unit cools the exhaust gas down to a dew point of water vapor such that the water vapor included in the exhaust gas can be condensed therefrom.

6. The fuel cell-engine hybrid system of claim 5, wherein the cooling unit comprises a channel through which the exhaust gas flows, a storage member provided in a lower portion of the cooling unit to storage condensed water, and an outlet formed in a lower end of the storage member to discharge stored water, and
   low temperature cooling water flows to the surface of the channel for heat exchange with the exhaust gas.

7. The fuel cell-engine hybrid system of claim 1, further comprising a carbon dioxide capturing unit capturing carbon dioxide discharged from the engine unit.

8. The fuel cell-engine hybrid system of claim 1, further comprising
   a recycling unit supplying carbon dioxide discharged from the engine unit to the cathode.

9. The fuel cell-engine hybrid system of claim 8, wherein the recycling unit comprises a control valve to control the supply amount of carbon dioxide.

10. The fuel cell-engine hybrid system of claim 1, further comprising,
    a turbo charger provided between the mixing unit and the engine unit.

11. The fuel cell-engine hybrid system of claim 10, wherein the turbo charger comprises a compressor and a turbine, the compressor is provided between a rear end of the mixing unit and an intake end of the engine, and the turbine is connected to an outlet of the engine unit.

12. The fuel cell-engine hybrid system of claim 11, further comprising an intercooler interposed between the compressor of the turbo charger and the engine unit.

13. The fuel cell-engine hybrid system of claim 11, further comprising an electric generator connected to the turbo charger to generate electric power according to driving of the turbine.

14. The fuel cell-engine hybrid system of claim 10, further comprising an anode recycling blower connected between an outlet and an inlet of the anode and supplying a part of the exhaust gas discharged from the anode to the inlet of the anode.

15. The fuel cell-engine hybrid system of claim 1, further comprising an anode recycling blower connected between an outlet and an inlet of the anode and supplying a part of the exhaust gas discharged from the anode to the inlet of the anode.

* * * * *